June 16, 1964    W. G. EMAUS, JR., ET AL    3,137,830
COOLANT TRANSFER STRUCTURE FOR TRANSFORMERS
Filed Aug. 17, 1961      2 Sheets-Sheet 1

INVENTORS
WILLIAM G. EMAUS JR.
WILLIAM H. CARRIGAN
BY

ATTORNEYS

June 16, 1964 W. G. EMAUS, JR., ETAL 3,137,830
COOLANT TRANSFER STRUCTURE FOR TRANSFORMERS
Filed Aug. 17, 1961 2 Sheets-Sheet 2

INVENTORS
WILLIAM G. EMAUS JR.
WILLIAM H. CARRIGAN
BY
*Price & Heneveld*
ATTORNEYS United States Patent Office

3,137,830
Patented June 16, 1964

3,137,830
COOLANT TRANSFER STRUCTURE
FOR TRANSFORMERS
William G. Emaus, Jr., and William H. Carrigan, Grand Rapids, Mich., assignors to Kirkhof Manufacturing Corporation, Grand Rapids, Mich., a corporation of Michigan
Filed Aug. 17, 1961, Ser. No. 132,177
3 Claims. (Cl. 336—57)

This invention relates to cooling structures for electrical transformers, and more specifically to a water transfer arrangement between two water-cooled secondaries of a high-capacity welding transformer.

In a common type of welding transformer, the secondary windings consist of a pair of series- or parallel-connectable U-shaped copper castings. For high-capacity welding work, these copper castings are hollow, and their hollow interior is connected to a water supply so that cooling water can be circulated through the castings. Rather than providing each casting with its own water inlet and outlet, it is usually economically desirable to provide a continuous coolant circuit through both castings, with the water inlet being located at one end of one casting and the outlet at the same end of the other. At the other end of the castings, the coolant chambers inside the castings must therefore be connected together by an appropriate transfer device which permits passage of water from one casting to the other but prevents electric flow therebetween.

The principal problem encountered in providing insulated water transfer means is the unavoidable cracking of all practically usuable insulating materials under the effect of aging, accelerated by the high temperatures generated in welding transformers, as well as of the vibrations, pressure surges, and mechanical stresses due to magnetic fields. In modern practice, welding transformer windings are commonly immersed in an epoxy resin which bonds the windings together and provides a heat transfer medium between the windings. Intimate contact of this epoxy resin with the windings is essential to proper heat transfer, and it is therefore impossible to move the windings relative to each other after assembly of the transformer without complete disassembly and reimmersion at the factory. For this reason, transfer means installed transversely to the plane of the windings and extending into the winding castings were unrepairable, and if they developed a crack, the transformer had to be returned to the factory for expensive repairs.

An attempt to overcome this problem was made by installing a U-shaped removable hose with fittings whose axes were in the plane of the windings, so that the hose could be removed without prying the windings apart. This solution, however, was unsatisfactory because the U-shaped hose was subject to kinking, and was somewhat difficult to install, hold in and remove. Furthermore, the hose was in the open and therefore subject to damage; and if a resilient material was used, such material was usually of low temperature capacity and subject to burning out during temporary current surges. In any event, the U-shaped hose did not eliminate the problem of aging and cracking of the transfer device, because the hose material was still thin and was connected to a current-carrying and therefore hot part of the assembly.

The present invention solves both the cracking problem and the repair problem by providing a solid block of insulating material which is pivotally held between specially provided non-current-carrying water-cooled arms of the castings and can be pivoted into the open for cleaning and replacement of the seals, or can be entirely slipped out from between the castings without separating them if a replacement is necessary. At the same time, its mass and the lower temperatures to which it is exposed make it much less subject to cracking and aging than previously used transfer devices, and its pivotal mounting makes it alignable into operating position without measuring tools. Moreover, the novel welding transformer secondary construction, when secured together, enables leg portions of the secondaries to be rigidly attached to substantially eliminate vibrational tendencies.

It is therefore the object of this invention to provide a coolant transfer device for insertion between two secondary winding castings in a welding transformer which is sturdy and yet can be removed and replaced without separating the winding castings.

It is a further object of this invention to provide a transformer structure in which the coolant transfer device is exposed to less heat than the major portion of the secondaries.

It is another object of this invention to provide a welding transformer secondary construction that not only provides effective coolant flow transfer means between adjacent spaced legs of a cast secondary, but which also rigidly secures the secondary legs against vibration, while also effectuating a heat sink out of the normal current flow path. When secured together, the structure is sturdy, unitary and practically free of vibration. When loosened in a simple manner, the transfer means can be readily removed for replacement of seals and so forth as necessary.

These and other objects of this invention will become apparent from a reading of the following specificatin, taken in connection with the attached drawings in which.

Basically, this invention consists of providing the secondaries to be joined with extension arms providing for a pivot bolt and a stop bolt to be passed through both arms. These arms are outside the current path of the secondaries but are water-cooled, so that their temperature is considerably lower than that of the current-carrying portions of the secondaries. The facing sides of these arms are so designed that an insulating block pivoted on the pivot bolt can be slid into position therebetween until it hits the stop bolt, and can then be held in frictional engagement with the facing sides by tightening the stop bolt and perhaps also the pivot bolt. A transfer passage is provided in the insulating transfer block and the facing sides of the arms have ports formed therein in such a position that when the transfer block hits the stop bolt, the transfer passage is exactly aligned with the ports in the arms and connects them. The comparatively low temperature to which the transfer block is exposed permits the use of resilient sealing means recessed in the transfer block so that when the block is in position, the coolant chambers of the two arms are connected by an unobstructed, fluid-tight passage.

Figure 1:
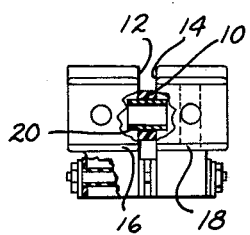
FIG. 1 is a fragmentary front elevation of a transformer showing one way of prior art arrangement of the water transfer means.
Figure 4:
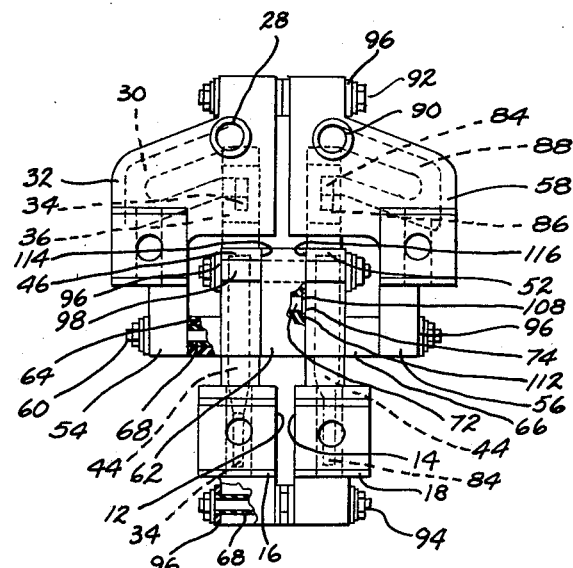
FIG. 4 is a front elevation of an assembled pair of secondaries according to the invention.
Figure 5:
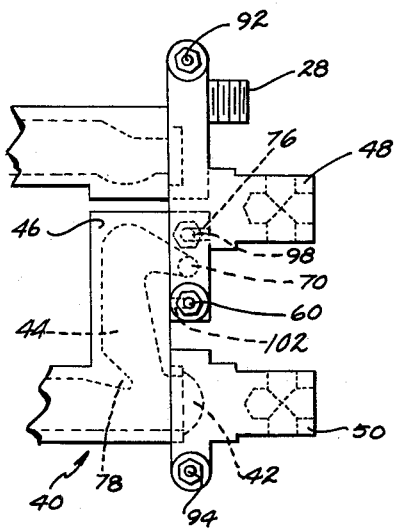
FIG. 5 is a partial side elevation of the device.

Referring now to the drawings, FIG. 1 will be recognized as a fragmentary end elevation showing the lower portion of the assembly of FIG. 4 without the arms. In FIG. 1, the prior art method of connecting the coolant chambers of the secondaries by a hose is shown. The hose 10 was made of a resilient material and was of a width exactly equal to the distance between the opposed faces 12, 14 of the contact heads 16, 18. However, in order to prevent its collapse, keep it in place, and keep it from leaking, it was necessary to insert a rigid tube 20 centrally of the hose 10. This tube 20 of necessity extended into the contact heads 16, 18 and made it impossible to remove the hose for replacement without laterally separating the secondaries. This type of prior art transfer member often broke down from pressure surges, vibration, heat, and mechanical stresses due to magnetic impulses. Also, the hose, if it had the required resilient and sealing properties, had to be made of a relatively low-temperature material which was subject to aging, cracks and destruction by accidental heat surges. To replace this weak link required a breakdown of the entire assembly, which in turn required the replacement of the primary windings and dipping of the entire transformer to replace the epoxy heat transfer compound and make it adhere to all the windings.

Figure 2:
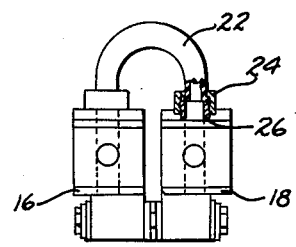
FIG. 2 is a like view showing another prior art arrangement of the water transfer means.

FIG. 2 again shows the contact heads 16 and 18 of FIG. 1, this time with another prior art type of transfer hose. It will be readily seen that the hose 22 of this embodiment was readily removable from the contact heads 16, 18 merely by unscrewing the fitting 24 from the threaded nipple 26. Thus, this prior art embodiment did not require disassembly of the entire transformer to replace the hose, but the hose still kinked rather easily, burned out when the transformer was temporarily overheated, and aged and cracked even more easily than the hose of FIG. 1, because its fittings were subjected to the high temperature of the current-carrying contact heads. Furthermore, the hose 22 was in the open and therefore more subject to mechanical damage. Also, since this type of hose had to be fastened rather than merely slipped into place during assembly of the transformer and required special fittings, it was more costly than the hose of FIG. 1.

Figure 3:
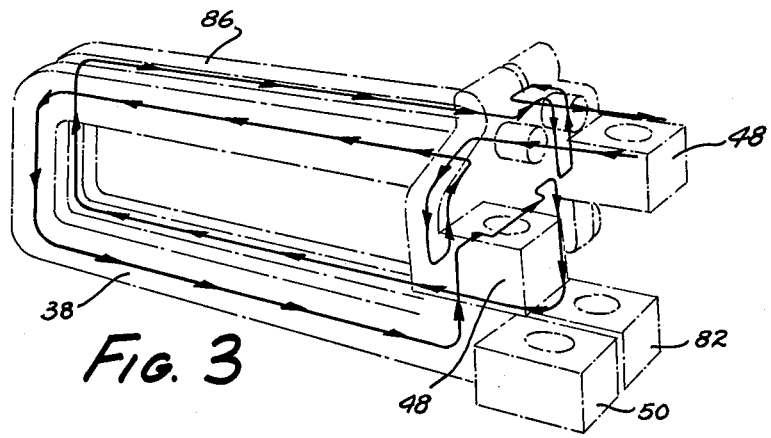
FIG. 3 is a perspective view showing the total water path through a pair of hollow secondary windings according to the invention.

The solution of these problems by the present invention is shown in FIGS. 3 through 6. As is best shown in FIGS. 3 and 4, cooling water is supplied to the transformer at the inlet 28. It then travels through the U-shaped conduit 30 formed in end plate 32, thereby cooling the end plate 32. The water then enters the coolant chamber 34 of secondary casting 36 and travels through the entire length of the U-shaped secondary 38 until it reaches end 40. At that point, water flows into and out of the recess 42 formed in the contact head 16 to cool it and its contact lug 50. The cooling water then flows into the cavity 44 of the arm 46. It will be noted that arm 46 is outside of the electrical current path from contact lug 48 to contact lug 50. Consequently, the arm 46 is a non-current-carrying member and can therefore be fashioned with considerably thinner walls than the rest of the casting 38. This permits the cavity 44 to be made wider in FIG. 4 than the rest of the coolant chamber 34. This in turn results in extra cooling of the arm 46, so that the arm 46 can serve as a heat sink for the casting 38 and yet remain at a considerably lower temperature. At the same time, the provision of arms 46 and 52, together with flanges 54, 56 formed on end plates 32, 58, respectively, makes it possible to provide the stop bolt 60 which not only serves as a stop for the transfer block 62 as hereinafter described, but in conjunction with spacers 64, 66 and insulating sleeve 68 serves to tie both ends of both secondaries together into a single rugged structural unit which is much less affected by vibration and mechanical stresses than previous constructions were.

From cavity 44, the coolant flows through port 70, transfer passage 72, and port 74 into cavity 44 of arm 52. The deflector 78 causes the coolant flowing out of cavity 44 to impinge upon the recess 42 to cool the contact head 18 and contact lug 82. From there, the coolant enters the coolant chamber 84 of the casting 86 and exits therefrom through the U-shaped channel 88 formed in end plate 58. The spent coolant leaves the transformer through the outlet 90.

Referring now to FIG. 4, it will be seen that the secondary assembly is held together at its upper and lower extremities by the tie bolts 92, 94. Like all other bolts in the assembly, the tie bolts 92, 94 are electrically insulated from the secondaries by insulating sleeves 68 and insulating washers 96. The upper ends of the arms 46, 52 are held together by a pivot bolt 98 which also serves as a pivot for the transfer block 62. In addition, the four ends of the secondaries are held together by the stop bolt 60 as has been previously described.

Figure 6:
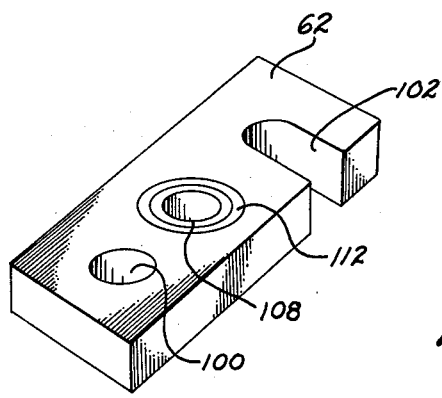
FIG. 6 is a perspective view of the transfer block of this invention.
Figure 7:
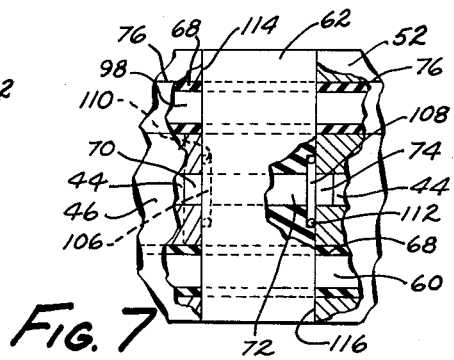
FIG. 7 is a fragmentary elevational view, partly in section, of the transfer block and its environment.

As is readily apparent from FIG. 6, the transfer block 62 is provided with a cylindrical opening 100 through which the pivot bolt 98 passes. A recess 102 permits the transfer block 62 to be slid over the stop bolt 60, which limits the pivotal of the block 62 by engaging the inner end of the recess 102. A transfer passage 72 extends through the block 62, and recesses 106, 108 are provided in the sides of the block adjacent the ends of the passage 72 to receive O-rings 110, 112 for sealing purposes, as best shown in FIG. 7. The transfer block 62 is made of an insulating material, preferably of molded glass-reinforced polyester material. In the alternative, any other insulating material impervious to water and having considerable mechanical strength at high temperatures may be used.

The assembly of the device of this invention is simple. When the two secondaries are ready to be assembled together, the stop bolt 60 and the tie bolts 92, 94, all with their sleeves 68 and washers 96, are first put into place, and the secondaries are slid together. The pivot bolt 98 with its insulating sleeve 68 is installed through the opening 100 of transfer block 62. Then the two ends of the pivot bolt 98 are placed into the slots 76 in arms 46 and 52. The O-rings 110, 112 are now placed into the recesses 106, 108, and the block 62 is then ready to be pivoted into place against the stop bolt 60. Pivotal movement of block 62 is not impeded by the O-rings 110, 112 because they are recessed in the block 62 to a sufficient degree that, when they are compressed into sealing position, their outer faces lie against the sides 114, 116 of arms 46, 52 in sealing relationship therewith. When the transfer block 62 is pivoted into place as far as stop bolt 60 permits it to go, the ports 70, 74 in the arms 46, 52 are automatically aligned with the transfer passage 72 in block 62. The pivot bolt 98 and the stop bolt 60 can now be tightened to bring block 62 into sufficient frictional contact with the sides 114, 116 that it will not again pivot out of place during operation of the transformer.

If the transfer block 62 should now become damaged or cracked (and in view of its massive construction and lesser exposure to heat, this is much less likely to occur than with the prior art devices), it is simply necessary to loosen bolt 60 and remove bolt 98 with its sleeve 68, and the block 62 can be slid out for repair or replacement—a simple maintenance matter which can be accomplished in little more than a minute.

It will be seen from the above description that the present invention provides a simple and effective way of constructing a secondary assembly for a welding transformer in such a manner that the insulating transfer block is protected from excessive heat and can be easily removed for replacement and reinstalled without parting the secondaries nor requiring difficult alignment. Obviously, the invention can be carried out in numerous ways, of which the embodiment described herein is merely illustrative. Therefore, it is not desired that the invention be limited by the embodiment shown, but only by the scope of the following claims.

We claim:

1. In a welding transformer having a pair of parallel fluid-cooled generally U-shaped secondaries arranged side-by-side in spaced relationship and having coolant chambers formed therein, the improvement comprising: each of said secondaries at one of its ends having an arm extending toward its other end but terminating short thereof; said arms being outside of the secondary electrical current path and having water carrying cavities occupying a major portion thereof communicating with said coolant chambers; a transfer block for transferring cooling fluid between said arms and properly spacing and supporting said arms; said block having a pair of planar generally parallel surfaces arranged to engage the sides of said arm; a fluid passage formed in said block in alignment with fluid ports formed in said arms; openings in said block and arms; means extending through said openings for securing the arms to said block and to each other; and means for providing a fluid tight seal between said passage and said ports when said passage and ports are in alignment.

2. In a welding transformer having a pair of parallel fluid-cooled generally U-shaped secondaries arranged side-by-side in spaced relationship and having coolant chambers formed therein, the improvement comprising: each of said secondaries at one of its ends having an arm extending toward its other end but terminating short thereof; said arms being outside of the secondary electrical current path and having water carrying cavities occupying a major portion thereof communicating with said coolant chambers; a transfer block for transferring cooling fluid between said arms and properly spacing and supporting said arms; said block having a pair of planar generally parallel surfaces arranged to engage the sides of said arms; a fluid passage formed in said block in alignment with fluid ports formed in said arms; openings in said block and arms; means extending through said openings for securing the arms to said block and to each other; means for providing a fluid tight seal between said passage and said ports when said passage and ports are in alignment; and said securing means including means pivotally mounting said block between said arms about an axis spaced from the axis of said passage for pivotal movement of said passage from between said arms for replacement of said seal means.

3. The combination set forth in claim 1 including means for mechanically tying together all four ends of said pair of secondaries, and also serving as pivot means for said transfer block.

References Cited in the file of this patent
UNITED STATES PATENTS

| | | |
|---|---|---|
| 1,045,056 | Mollinger | Nov. 19, 1912 |
| 2,127,501 | Dall | Aug. 23, 1938 |
| 2,200,546 | Furman | May 14, 1940 |
| 2,275,018 | Neve | Mar. 3, 1942 |
| 2,590,866 | Jost | Apr. 1, 1952 |
| 3,024,431 | Girton | Mar. 6, 1962 |
| 3,038,731 | Milleron | June 12, 1962 |